United States Patent [19]

Burke

[11] Patent Number: 4,887,363
[45] Date of Patent: Dec. 19, 1989

[54] FLUIDIZED BED HOPPER

[75] Inventor: Richard D. Burke, Amherst, Ohio

[73] Assignee: Nordson Corporation, Westlake, Ohio

[21] Appl. No.: 70,972

[22] Filed: Jul. 8, 1987

[51] Int. Cl.⁴ ............................................. F26B 17/00
[52] U.S. Cl. .......................................... 34/57 A; 34/10
[58] Field of Search ................. 34/57 A, 10; 110/245, 110/263; 122/4 D; 431/7, 170; 432/15, 56; 165/104.16

[56] References Cited

U.S. PATENT DOCUMENTS

| | | | |
|---|---|---|---|
| 3,480,265 | 11/1969 | Deve | 34/57 A |
| 3,829,983 | 8/1979 | White | 34/57 A |
| 3,925,024 | 12/1975 | Hollingsworth et al. | 34/57 A X |
| 4,115,500 | 9/1978 | Voegeli | 264/122 |
| 4,120,680 | 10/1978 | Cross | 165/104.16 |
| 4,478,620 | 10/1984 | Tamura | 55/486 |
| 4,493,364 | 1/1985 | Macriss et al. | 165/104.16 X |
| 4,615,649 | 10/1986 | Sharpless | 406/138 |

OTHER PUBLICATIONS

Brochure entitled "Viledon Filter" of Carl Freudenberg, Viledon Industrielle Vliesstoffe, 9/85.
Brochure entitled "Technical Data-EP Brand Porous Structure" of EP International, 9/85.

Primary Examiner—Henry A. Bennet
Attorney, Agent, or Firm—Wood, Herron & Evans

[57] ABSTRACT

A fluidizing bed hopper having a plenum chamber and an air pervious fluidizing bed plate defining the top surface of that plenum chamber. The fluidizing bed plate is of two ply and comprises a first ply of rigid porous structure and a second ply of non-woven filter media. In the preferred embodiment, the first ply of rigid porous structure comprises spherical glass beads bonded together to form a network of interstitial pores of substantially uniform size. The filter media preferably comprises point sealed, thermally bonded, non-woven polypropylene fibers.

17 Claims, 1 Drawing Sheet

FLUIDIZED BED HOPPER

This invention relates to apparatus for fluidizing powder, and more particularly to an improved apparatus for fluidizing very fine powder particles.

Fluidization of solids is a well known process wherein small solid particles are suspended in an upwardly directed stream of gas. To achieve that "fluidized bed" as it is called, a gas, usually air, is directed upwardly from an air plenum through a solid, porous bed of suitably sized particles at a velocity sufficiently high to buoy or suspend the particles to overcome gravity, but without sweeping or blowing the particles out of the container within which the fluidized bed is housed. A fluidized bed is a stable suspension of the small solid particles wherein all of the particles are contained between a lower boundary at which air enters the bed from the solid porous bed, and an upper well-defined boundary at which the upwardly directed stream of gas disengages itself from the small solid particles.

Commonly, the solid porous bed through which the airstream is directed into the fluidized bed is referred to as a "fluidizing plate." This fluidizing plate is generally located in the bottom of a container or hopper within which the small solid particles are housed or contained. The fluidized plate is generally a sintered metal or similar porous plate having evenly dispersed pores therein through which air or other gas is directed from a plenum beneath the plate. The velocity of the gas determines the turbulence and density of the powder particles contained with the fluidized bed.

One use of a fluidized bed is to obtain a uniform dispersion or cloud of air entrained solid particles from which the solid particles may be pumped via a conventional pneumatic pump to a powder spray system. One such system is illustrated and described in U.S. Pat. No. 4,615,649, issued Oct. 7, 1986 in the name of John Sharpless.

If the powder within a fluidized bed is non-uniformly distributed or dispersed throughout the fluidized bed, then an uneven or non-uniform flow of powder will be pumped from the fluidized bed. This results in variations in the density of powder pumped from the fluidized bed. If the pump supplies powder to a powder spray system, then an uneven flow of powder will be supplied to the spray nozzle of the system. Thereby, a non-uniform spray will be generated by the dispersion of gas. Such a non-uniform spray is undesirable because it results in a non-uniform coating of solid powder being applied to an article sprayed by the system.

One determinant in the maintenance of a uniform or even distribution of powder particles throughout a fluidized bed is the velocity of the airstream required to maintain the powder in suspension. This in turn is a function of the air pressure supplied to the air plenum from which the air passes upwardly into the fluidized bed. The lower this pressure, the lower the air velocity of the air or gas stream directed into the fluidized bed of powder, and the less the turbulence of the powder particles in the fluidized bed. The less the turbulence, the more even the flow of air entrained powder pumped from the fluidized bed and supplied to a system from the fluidized bed.

A common problem encountered with all fluidizing beds is that of fluidizing very fine powders, as for example, powders on the order of 1-10 microns in diameter. Such fine powders are particularly difficult to distribute evenly within a fluidized bed of such particles. There tend to be areas of greater concentration of fine powders in one portion of the fluidized bed and voids in other portions of the bed. In part, these variations in powder densities within the fluidized bed are attributable to gas turbulence within the bed.

Fine particle powders also create a problem because of the tendency for the fine particles to migrate through the porous fluidizing plate into the air plenum chamber located beneath the porous plate. Those particles then are available to contaminate subsequent powders fluidized within the same hopper when those particles again migrate upwardly through the fluidizing plate from the air plenum. Additionally, the small particle powders tend to plug the pores of the fluidizing bed plate, thereby contributing to uneven distribution of fluidized particles above the plate.

It has therefore been an objective of this invention to provide an improved fluidized bed hopper for fluidizing very small particle powder materials and for maintaining an even distribution of such fine powder particles within a fluidized bed.

Still another objective of this invention has been to provide a new improved fluidized bed hopper wherein a more uniform distribution of fine particles of powder may be achieved within the hopper and without any tendency of the fine particles to plug the pores of the fluidizing plate of the fluidizing bed.

Still another objective of this invention has been to provide an improved fluidized bed hopper capable of fluidizing very finely ground or fine particle powders at much lower pressures than those which have heretofore been required to maintain an even distribution of finely ground or very small particle powders in a fluidized bed.

These objectives are achieved, and this invention is in part predicated upon the concept of an improved air pervious fluidizing bed plate. According to the practice of this invention, the plate is manufactured from a first ply of rigid porous structure and a second ply of filter media overlying that rigid porous structure.

In accordance with the practice of this invention, the rigid porous structure comprises spherical particles in the form of small glass beads bonded together to form a network of interstitial pores of substantially uniform size. The filter media comprises a thin web of thermally bonded non-woven filter media, preferably thermally bonded non-woven polypropylene fibers. In the preferred practice of this invention, the solid porous plate has interstitial pores which may be anywhere from 15-175 microns in size. The preferred filter media is rated as being at least 99% efficient at filtering solid particles one micron or larger in size (using ASTM F500 standard filter test).

The primary advantage of this invention is that it enables very fine particle powders, as for example, powders in the 1-10 micron diameter size, to be fluidized and to be uniformly distributed throughout a fluidizing bed of such particles. It also enables those fine particle powders to be fluidized at a lower pressure and with a lower velocity air or gas stream than has heretofore been possible.

These and other objects and advantages of this invention will be more readily apparent from the following description of the drawings in which.

Figure 1:
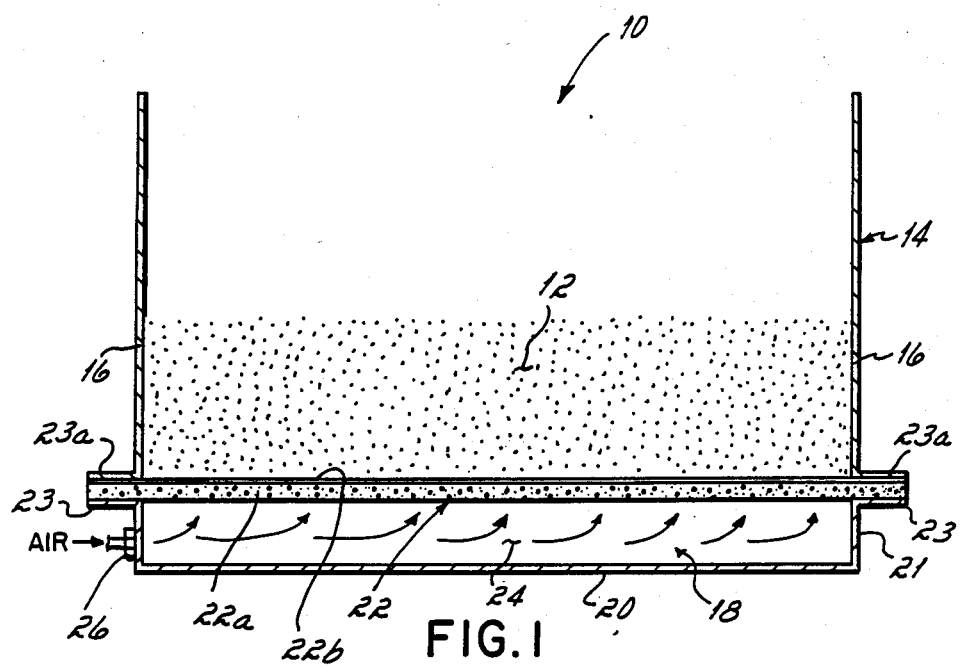
FIG. 1 is a side elevational view, partially in cross section, of a fluidizing bed hopper incorporating the invention of this application.

Referring first to FIG. 1, there is illustrated a fluidizing bed hopper 10 for fluidizing solid particulate material 12. The fluidizing bed hopper 10 comprises a conventional open top container 14 having four side walls 16 mounted atop an air plenum 18. The air plenum comprises an air impervious bottom wall 20, air impervious side walls 21, and spaced upwardly from the bottom wall, an air pervious fluidizing plate or top wall 22. The air pervious top wall 22 extends between the four side walls of the plenum and is sealingly secured between a top plenum chamber flange 23 and a bottom container flange 23a.

The air pervious plate 22, the parallel bottom wall 20, and the side walls 21, define an air chamber 24 into which air at a pressure above that of the atmosphere is introduced from a source (not shown) through a side wall fitting 26. This high pressure air passes from the air chamber upwardly through the air pervious plate 22 to fluidize powder 12 contained interiorly of the container 14. Container 14 generally includes a cover member (not shown) and an air vent (not shown) in the cover member to vent the air out of the container after it passes upwardly through the powder.

This invention is primarily intended for fluidizing very finely ground or very fine particle powders, such as powders on the order of from 1 to 10 microns in diameter. When fluidized by conventional or prior art fluidizing bed hoppers, these powders pump unevenly from the hopper. They also tend to plug the fluidizing plate, as well as to migrate through the fluidizing bed plate.

Figure 2:
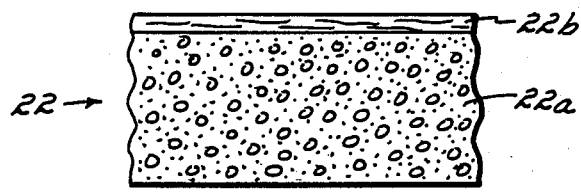
FIG. 2 is an enlarged cross sectional view of a fluidizing bed plate incorporating the invention of this application.

With particular reference to FIG. 2, it will be seen that the fluidizing bed plate 22 is of two ply. The lower or bottom ply 22a of this plate is a rigid porous structure, preferably on the order of from 6 to 7 millimeters in thickness. The second ply, the top ply 22b, comprises a filter media overlying the rigid porous plate. In the preferred practice of this invention, this filter media ply 22b is approximately 0.8 millimeters in thickness.

One lower ply, rigid porous plate 22a, preferably used in the practice of this invention, is made from spherical glass beads having a mean diameter of approximately 200 microns (size range 177-250 microns) coated with a thermosetting epoxy resin and bonded together by that resin. This plate has a maximum pore size in the interstitial spaces between the epoxy coated glass beads in the range of 15-175 microns, an average porosity in the range of 8-90 microns. A complete description of the manner in which this plate is made may be found in U.S. Pat. No. 4,115,500 of D. W. Voegeli, issued Sept. 19, 1978. Plates made in accordance with the disclosure of this patent and suitable for the practice of this invention are manufactured and sold by Eaton Products International, Inc. and are identified as EP 60 Brand Porous Structures.

The second ply 22b of the porous plate 22 comprises the thin ply of filtering media. In the preferred practice of this invention, this filtering media is a point-sealed, thermally bonded non-woven polypropylene filter media manufactured by Viledon Industrielle Vliesstoffe of Weinheim, West Germany, and designated as their Viledon Non-Woven Polypropylene Filter FE2545.

This filter medium is sold in roll form and is manufactured from a 100% polypropylene fiber and a 100% polypropylene scrim. It has a weight (DIN 53854) of 320 grams per meter$^2$, and a thickness (DIN 53855/1) of 0.8 millimeters. It has an air permeability (DIN 53887) of 230 dm$^3$/s m$^2$ at 2.0 mbar and a filter efficiency rating of 99% of powder particles 1 micron in size (ASTM F500 standard test).

A complete description of the filter media and the manner in which it is manufactured may be found in U.S. Pat. No. 4,478,620 of T. Tamura, issued Oct. 23, 1984.

The filter media 22b is cut to the same profile as the top surface of the rigid porous structure of the first ply and is overlaid over the top surface of the rigid porous structure of the first ply. The two plies are then sandwiched between the flange 23 on the top of the plenum chamber 18 and the flange 23a of the powder container 14 mounted above the flange 23 of the plenum 18. The two flanges 23, 23a and plate 22 may be secured together via any conventional connector.

In the practice of this invention, powder is poured into the open top of the container. According to the practice of this invention, this powder is preferably on the order of 1-10 microns in diameter. Air at a pressures greater than atmosphere is then supplied to the plenum via the fitting 26. This air is generally supplied to the plenum chamber at a pressure of approximately 12 p.s.u. and a flow rate of from 5 to 40 cubic feet per minute. This flow rate is appropriate for a fluidizing plate 22 having a surface area of approximately 596 square inches. The air at this pressure is caused to flow upwardly through the rigid porous plate 22a and through the filter media 22b so as to suspend the powder 12 contained in the container 14 within the airstream above the porous plate. So long as air at this pressure and flow rate is supplied to the plenum, the powder contained in the container will be suspended and evenly distributed within the fluidized bed of powder contained in the hopper. As a consequence of the improved two-ply porous fluidizing plate of this invention, the powder is maintained in a very uniform even distribution throughout the container such that it may be pumped from the container in an even flow via a conventional pneumatic pump.

While I have described only a single preferred embodiment of my invention, persons skilled in this art will appreciate changes and modifications which may be made without departing from the spirit of my invention. Therefore, I do not intend to be limited except by the scope of the following appended claims.

I claim:

1. A fluidizing bed hopper for fluidizing very fine particle powders of from approximately 1 to 10 microns in diameter comprising
   a container having side walls,
   an air plenum in the bottom of said container,
   said air plenum having air impervious side walls, an air impervious bottom wall, and an air pervious top wall spaced above said bottom wall,
   means for admitting air under pressure greater than atmospheric pressure to the interior of said air plenum, and
   the improvement wherein said air pervious top walls comprises
   (a) a rigid porous plate, and
   (b) a non-woven fiber filter media overlying said rigid porous plate.

2. An air plenum for use in combination with a fluidizing bed hopper for fluidizing very fine particle powders of from approximately 1 to 10 microns in diameter, said air plenum comprising air impervious side walls, and air impervious bottom wall, and an air pervious top wall spaced above said bottom wall,
means for admitting air at a pressure greater than atmospheric pressure into the interior of said plenum, and
the improvement wherein said air pervious top wall comprises
(a) a rigid porous plate, and
(b) a non-woven fiber filter media overlying said rigid porous plate.

3. A fluidizing bed hopper for fluidizing very fine particle powders of from approximately 1 to 10 microns in diameter comprising
a container having side walls,
an air plenum in the bottom of said container,
said air plenum having air impervious side walls, an air impervious bottom wall, and an air pervious top wall spaced above said bottom wall,
means for admitting air under pressure greater than atmospheric pressure to the interior of said air plenum, and
the improvement wherein said air pervious top wall comprises
(a) a rigid porous plate, said rigid porous plate comprising spherical particles bonded together to form a network of interstitial pores of substantially uniform size, and
(b) a non-woven fiber filter media overlying said rigid porous plate.

4. A fluidizing bed hopper for fluidizing very fine particle powders of from approximately 1 to 10 microns in diameter comprising
a container having side walls,
an air plenum in the bottom of said container,
said air plenum having air impervious side walls, an air impervious bottom wall, and an air pervious top wall spaced above said bottom wall,
means for admitting air under pressure greater than atmospheric pressure to the interior of said air plenum, and
the improvement wherein said air pervious top wall comprises
(a) a rigid porous plate, and
(b) a non-woven fiber filter media overlying said rigid porous plate, said non-woven filter media being made from fibers which are bonded together.

5. An air plenum for use in combination with a fluidizing bed hopper for fluidizing very fine particle powders of from approximately 1 to 10 microns in diameter, said air plenum comprising air impervious side walls, and air impervious bottom wall, and an air pervious top wall spaced above said bottom wall,
means for admitting air at a pressure greater than atmospheric pressure into the interior of said plenum, and
the improvement wherein said air pervious top wall comprises
(a) a rigid porous plate, said rigid porous plate comprising spherical particles bonded together to form a network of interstitial pores of substantially uniform size, and
(b) a non-woven fiber filter media overlying said rigid porous plate.

6. An air plenum for use in combination with a fluidizing bed hopper for fluidizing very fine particle powders of from approximately 1 to 10 microns in diameter, said air plenum comprising air impervious side walls, and air impervious bottom wall, and an air pervious top wall spaced above said bottom wall,
means for admitting air at a pressure greater than atmospheric pressure into the interior of said plenum, and
the improvement wherein said air pervious top wall comprises
(a) a rigid porous plate, and
(b) a non-woven fiber filter media overlying said rigid porous plate, said non-woven filter media being made from fibers which are bonded together.

7. A multiple-ply fluidizing plate for use in a fluidizing bed hopper for fluidizing very fine particle powders of from approximately 1 to 10 microns in diameter, said plate comprising
a rigid porous structure, said rigid porous structure comprising spherical particles bonded together to form a network of interstitial bores of substantially uniform size, and
a filter media overlying said porous structure, said filter media comprising a non-woven fiber media.

8. A multiple-ply fluidizing plate for use in a fluidizing bed hopper for fluidizing very fine particle powders of from approximately 1 to 10 microns in diameter, said plate comprising
a rigid porous structure, and
a filter media overlying said porous structure, said filter media comprising a non-woven fiber media, said non-woven fiber media being made from fibers which are bonded together.

9. The plenum of claim 3 or 5 wherein said spherical particles are glass beads.

10. The plenum of claim 3 or 5 wherein the maximum size of said interstitial pores is in the range from 15 to 175 microns in size.

11. The plenum of claim 4 or 6 wherein said filter media has an efficiency of at least 99% of solid particles one micron in size.

12. The plenum of claim 4 or 6 wherein said filter media is made from polypropylene fibers.

13. A multiple-ply fluidizing plate for use in a fluidizing bed hopper for fluidizing very fine particle powders of from approximately 1 to 10 microns in diameter, said plate comprising
a rigid porous structure, and
a filter media overlying said porous structure, said filter media comprising a non-woven fiber media.

14. The fluidizing plate of claim 7 wherein the maximum size of said interstitial pores are in the range from 15 to 175 microns in size.

15. The fluidizing plate of claim 7 wherein said spherical particles are glass beads.

16. The fluidizing plate of claim 8 wherein said filter media has an efficiency rating of at least 99% of particles 1 micron in size.

17. The fluidizing plate of claim 8 wherein said filter media comprises polypropylene fibers.

* * * * *